(12) United States Patent
Syslak et al.

(10) Patent No.: US 6,604,669 B1
(45) Date of Patent: Aug. 12, 2003

(54) MANIFOLD FOR HEAT EXCHANGER AND PROCESS THEREFOR

(75) Inventors: Morten Syslak, Haugesund (NO); Leiv Adne Folkedal, Kopervik (NO); Antonio Baldantoni, Ann Arbor, MI (US)

(73) Assignee: Norsk Hydro, A.S., Oslo (NO)

( * ) Notice: Subject to any disclaimer, the term of this patent is extended or adjusted under 35 U.S.C. 154(b) by 0 days.

(21) Appl. No.: 09/890,108

(22) PCT Filed: Nov. 22, 1999

(86) PCT No.: PCT/EP99/09144

§ 371 (c)(1),
(2), (4) Date: Dec. 4, 2001

(87) PCT Pub. No.: WO00/45106

PCT Pub. Date: Aug. 3, 2000

(30) Foreign Application Priority Data

Jan. 29, 1999 (EP) .............................. 99200246

(51) Int. Cl.⁷ ..................... B23K 31/02; B23K 35/12; F28F 1/00
(52) U.S. Cl. .................. 228/166; 228/183; 228/246; 29/890.054; 165/186

(58) Field of Search ................. 228/183, 245, 228/246, 247, 180.5, 164, 165, 166; 29/890.03–890.54; 165/186

(56) References Cited

U.S. PATENT DOCUMENTS

| | | | | |
|---|---|---|---|---|
| 4,059,882 A | * | 11/1977 | Wunder | 29/890.036 |
| 4,448,343 A | * | 5/1984 | Kochka et al. | 228/205 |
| 4,712,721 A | * | 12/1987 | Noel et al. | 228/56.3 |
| 5,158,133 A | * | 10/1992 | Duong | 165/78 |
| 5,400,603 A | * | 3/1995 | Bauer et al. | 62/51.1 |
| 5,626,278 A | * | 5/1997 | Tang | 228/56.3 |
| 5,692,300 A | * | 12/1997 | Conn et al. | 29/890.053 |

FOREIGN PATENT DOCUMENTS

JP 361144266 A * 7/1986

\* cited by examiner

*Primary Examiner*—Tom Dunn
*Assistant Examiner*—Kiley Stoner
(74) *Attorney, Agent, or Firm*—Hartman & Hartman, P.C.; Gary M. Hartman; Domenica N. S. Hartman

(57) ABSTRACT

Manifold for a heat exchanger intended to be joined by brazing or soldering to heat transfer tubes. A portion of a surface of the manifold that will be joined to the tubes is proved with at least one recess in which a brazing material is mechanically locked.

20 Claims, 2 Drawing Sheets

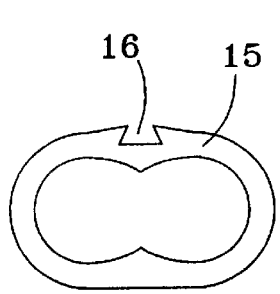 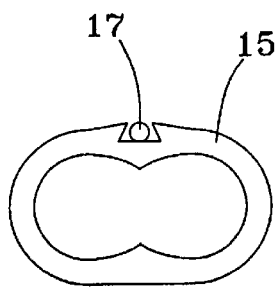 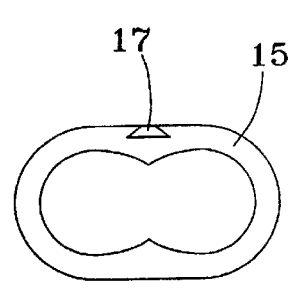
FIG.4a    FIG.4b    FIG.4c
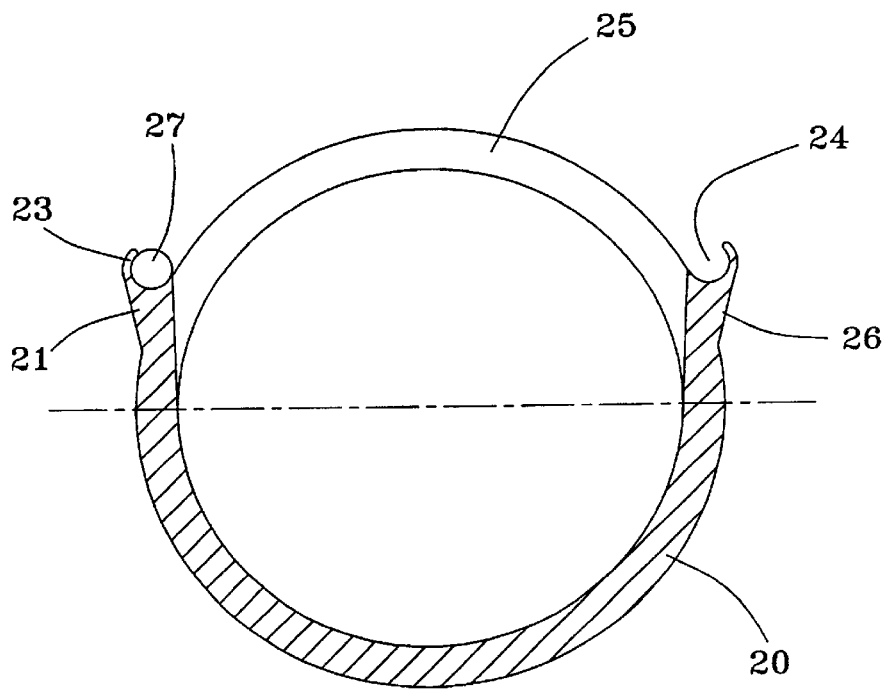
FIG.5

MANIFOLD FOR HEAT EXCHANGER AND PROCESS THEREFOR

CROSS REFERENCE TO RELATED APPLICATIONS

This application claims the benefit of International Application No. PCT/EP99/09144, filed Nov. 22, 1999, and European Patent Application No. 99200246.9, filed Jan. 29, 1999.

BACKGROUND OF THE INVENTION

This invention relates to an aluminium product to be joined by brazing or soldering to another aluminium product.

Such a product is generally known in WO-A-98/51983 and all technical information disclosed is that patent application is incorporated by reference in this description.

It is common practice to join aluminium components by disposing an aluminium brazing alloy between or adjacent to the component surfaces to be joined, and heating the brazing alloy and the joining surfaces in appropriately assembled fashion to a temperature (brazing temperature) at which the brazing alloy melts while the components remain unmelted. Upon subsequent cooling the brazing alloy forms a filet or joint that bonds the joining surfaces of the components. For assured selective melting of only the brazing alloy in the heating step, it is commonly preferred that the melting point of the brazing alloy be at least 30° to 40° C. lower than that of the metal of the components. An example of a typical aluminium brazing alloy is an aluminium-silicon eutectic composition, which starts to melt at about 577° C.

The use of clad composite aluminium brazing sheet to join aluminium alloy components is well known. Brazing sheet is used to manufacture heat exchanger components such as tubes, fins, headers, tanks, flow dividers, etc. However an important limitation is that it is difficult to manufacture complicated profiles only using rolled sheet. For complicated profiles such as e.g manifolds or micro tubes, the extrusion process may offer a more cost efficient and better quality solution. One disadvantage of using extruded profiles is has been a problem furnishing extrusions with a braze alloy coating.

The CD process is one of the methods that have been developed in order to produce a braze "clad" extruded profile. In this process the profile is coated with AlSi particles coated with NOCOLOK flux Adhesion of the coating is achieved through the use of a binder (polymer). The addition of AlSi particles provides filler metal for braze joints during the brazing process.

In the "Brazeliner" process the profile is coated with a mixture of NOCOLOK and particulate AlSi-alloy. Adhesion of the coating is achieved through the use of a binderx (polymer). The AlSi particles melt and flow during brazing.

The Sil flux process is a method where the profile is coated with a mixture of NOCOLOK and fine Silicon particles. Adhesion of the coating is achieved through the use of a binder. (polymer). During brazing the Si diffuses into the surface and forms a eutectic AlSi alloy thus creating filler metal for braze joints "in situ".

A disadvantage with all the above processes is the use of a binder. The binder tends to "poison" the furnace atmosphere and also presents an environmental issue. In order to overcome these problems costly furnace modifications have been required. For the Sil-Flux process also Silicon erosion tends to be more pronounced due to the presence of particulate Silicon.

Arc flame spray coating is another method where the profile is coated with an AlSi alloy. During this process a lot of oxides is introduced that is undesirable in the brazing/soldering operation.

With all the above efforts to produce an extruded product with a pre-placed filler metal, it still remains a problem in the industry.

BRIEF SUMMARY OF THE INVENTION

It is therefor an object of the invention to provide an aluminium product in which the above mentioned problems are avoided.

This object is achieved in that the position of the outer surface of the first aluminium product which will be connected to the second aluminium product is provided with at least one recess in which there is locked an amount of brazing material.

By means of this "mechanical" assembly it is possible to provide an aluminium product in an integrated manner with the amount of brazing material without the need to use special compositions in order to adhere the brazing material to the aluminium product. It becomes even possible to use commercially available brazing materials, which after being locked in the recess allow the aluminium product to be handled in a normal way, such that the brazing material stays in place during subsequent handling or fabrication operations such are shipping, machining, forming, stamping, cutting, washing or degreasing.

In a preferred embodiment of the invention each recess has the shape of a groove and the amount of brazing material has the shape of a wire.

In this way it becomes possible to use commercially available flux core wire thus eliminating the need for additional fluxing of the aluminium product.

Other advantages and characteristics of this invention will become clear from the following description, reference being made to the annexed drawings, in which

BRIEF DESCRIPTION OF THE DRAWINGS

FIGS. 4A–4C are schematic cross-sections of another modified embodiment of a manifold according to the invention, and FIG. 5 is a cross-section of a third modified embodiment of a manifold according to the invention,

DETAILED DESCRIPTION OF THE INVENTION

Figure 1:
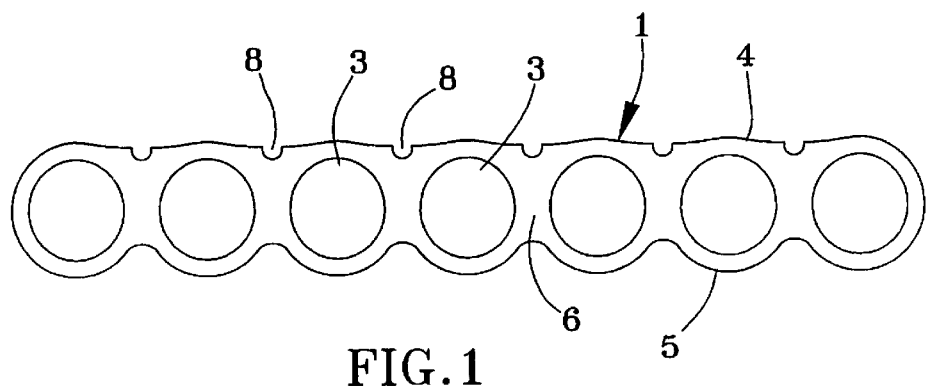
FIG. 1 is a cross section of a manifold as an aluminium product according to the invention.

In FIG. 1, there is shown by way of example a manifold 1, but the invention is not restricted to this type of products, but can be used in any aluminium products which must be brazed after shaping.

The manifold 1 is made up of aluminum tubes 3 with holes (not shown) for accommodating the ends of heat transfer tubes. As further shown in FIG. 1 the manifold 1 consists of a number of parallel tubes 3, with common wall portions 6, and shaped as a flat product having two bigger walls 4 and 5. In the wall 4 and parallel to the flowing channels of the tubes 3 a number of grooves 8 is provided, which are located above each intermediate wall section 6 of the manifold 1. In the embodiment shown these grooves 8 have a more than half circular cross-section. The manifold 1 shown in FIG. 1 can conveniently be made by means of an extrusion.

As shown in the left end portion of FIG. 1 a brazing wire can be inserted into the groove 8 in such a way that it is fixed by a form-locking manner in the groove. When later in the manufacturing of the heat exchanger the manifold 1 has to be connected with the end portions of the heat exchanging tubes, the material of the wires 9 can be melted and used as brazing material.

Figure 2:
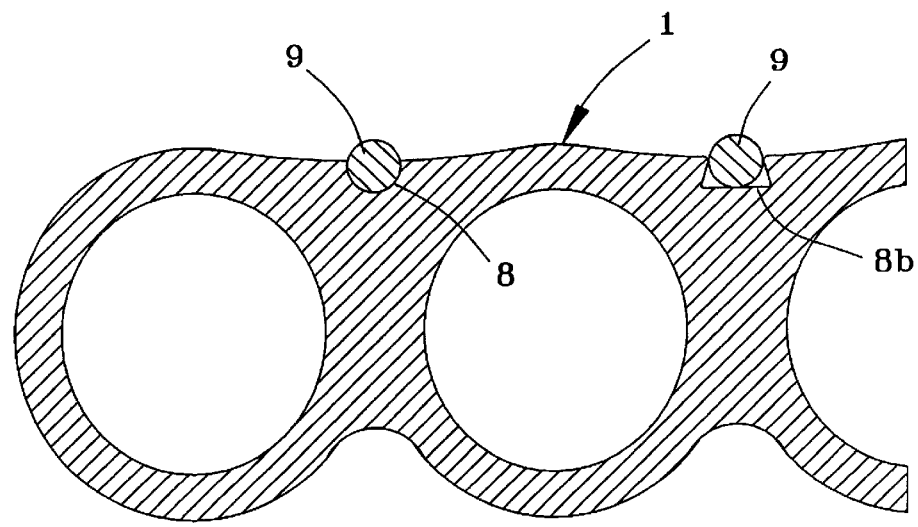
FIG. 2 is a cross-section of a manifold as an aluminium product according to the invention showing different shapes of grooves.

In the right end portion of FIG. 2 there is shown a different type of groove 8B having a cross-section in the shape of a trapezium. It is possible to have a round brazing wire clamped into such a groove, but also brazing wires with other cross-sections can be clamped such as square, triangular or oval.

The grooves 8, 8B may be designed in such a way that the brazing wire can be positioned on top of the groove and subsequently be mechanically inserted and locked in the groove, e.g. by applying a pressure. This can be done immediately after extrusion of the manifold, but also later in the manufacturing of the manifold or even just before the production of the heat exchangers.

The different steps in the process of preparing such a manifold may be cutting the extruded profile into pieces of a defined length;
fabricating holes in the profile by e.g. stamping, milling, sawing, etc.;
inserting flow dividers into the profile pieces;
washing an degreasing of the profile pieces;
inserting the brazing wires;
inserting the heat exchanger tube ends into the holes made in the profile pieces;
brazing the tube ends to the manifold or profile pieces.

During the brazing/soldering process the brazing wire melts and through capillary action and if present assisted by a flux, the molten wire is drawn into the manifold/tube joint. During cooling the liquid metal solidifies to create a solid joint between manifold and tubes and other components that are attached to the manifold in such a way that it is in contact or dose to the brazing wire.

Profiles such as manifolds for heat exchangers are generally made either as extrusions or from clad composite braze sheet. It is common to produce manifolds from a variety of aluminium alloys, examples being the AA 1000 or 3000, and more particularly AA 1100, AA 1197, AA 3003 and AA 3102. Also it is common that the filler metal used to join the manifold to the tubes and other components are from the AA 4000 series aluminium alloys or more particularly AA 4343, AA 4045, AA 4047, AA 4343+1% Zinc, and AA 4045+1% Zinc AA is common alloy designations by the Aluminium Association (AA). Those skilled in the art will recognise that the teachings of this invention are not limited to the particular aluminium alloys used by example in the following description, but can generally be considered to encompass a wide variety of aluminium base alloys.

The shape of the groove is important in that it must be designed in such a way that
 a. the filler wire is "locked" in place,
 b. it protects the filler wire from being tom out or in other ways damaged during product handling.
 c. the cross sectional area is sufficiently large for the groove to carry enough filler metal for successful brazing or soldering.

Figure 3A:
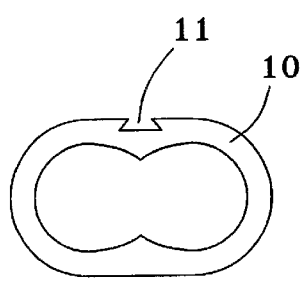
FIGS. 3A–3C are schematic cross-sections of a modified embodiment of a manifold according to the invention.
Figure 3B:
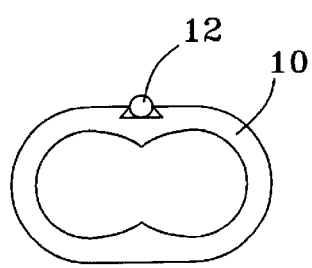
Figure 3C:
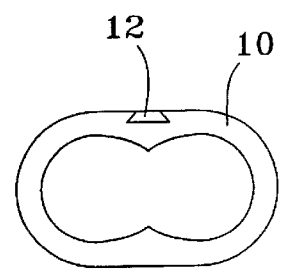

In the FIGS. 3A–3C there is shown another embodiment of a manifold according to the invention. As shown in FIG. 3A the manifold 10 is provided with a trapezium-shaped groove 11, which is designed such that when pressure is applied to a filler metal wire 12 which is placed in the groove (FIG. 3B), this wire 12 is squeezed into the groove and mechanically locked in place. This wire 12 can if needed be pressed in place by passing the manifold 10 through the nip of a set of pressing rolls, thereby obtaining a final shape as shown in FIG. 3C.

The embodiment of FIGS. 4A–4C is somewhat different form the one shown in the FIGS. 3A–3C in that the manifold 15 is provided with a groove 16 with a upper cross-dimension which is larger than the diameter of the filler metal wire 17 to be placed in said groove (FIG. 4B) In this way the wire 17 can easily be positioned into the groove 16 whereupon the manifold 15 can be passed through the nip of a set of pressure rolls thereby obtaining the product as shown in FIG. 4C.

In FIG. 5 there is shown a manifold 20 which is modified with respect to the manifolds shown in the previous drawings in that here a round tube is used as manifold, which is provided with two extensions 21 and 26 providing channels 23 and 24, which are located at the ends of the openings 25 to be made in the manifolds for accepting the heat exchanging tubes.

In each case the extruded tube has channels 23, 24 placed in such a way as to allow the brazing compound or filler 27 wire to nearly contact the tube that is eventually fitted into the opening or slot 25. When the brazing compound reaches its melting point the liquid metal can be more easily drawn to the joint by capillary action. When the pipe diameter is relatively small, e.g. 10–40 mm, the radius of currature is such that the major force moving the molten filler metal to the joint is capillary. The typical orientation of a heat exchanger in a braze furnace is with the long axis of the manifold pipe in the horizontal direction. The joints will be drawing metal from both the top and bottom channels.

As the diameter becomes larger the effect of gravity becomes more important. In this case the design of the manifolds can be modified in such a way that the openings or slots 15 are made in a surface of minimal currature to prevent the filler metal from sogging and falling out of the channel when molten.

The present invention also offers a method of closely controlling the amount of filler metal. Those skilled in the art will know that too little filler metal will result in small or non leak proof fillets, and that too much can result in tube erosion which in the worst case also will end up as leaks. The required amount of filler metal for successful brazing or soldering is dependent on the actual void or gap to be filled. In the case of a manifold to tube joint/fillet in a heat exchanger, the volume of this void will vary with the outer dimensions of the tube, the inner dimensions of the manifold slot (where the tube is inserted) and the wall thickness of the manifold. When the total number of manifold to tube joint per manifold is known, the total amount of filler metal required can be calculated. Based upon the result of this calculation the required filler metal can be easily dosed into the grooves.

What is claimed is:
1. A first aluminum article having a surface configured for joining by brazing or soldering to a second aluminum article, a portion of the surface of the first aluminum article being provided with at least one recess in which an amount of brazing material is mechanically locked as a result of cross-sectional shapes of the brazing material and the recess.

2. A first aluminum article according to claim 1, wherein the recess has the cross-sectional shape of a groove and the amount of brazing material has the cross-sectional shape of a wire.

3. A first aluminum article according to claim 1, wherein the amount of brazing material is mechanically locked in the recess by means of force-transmitting or form-locking manner.

4. A first aluminum article according to claim 2, wherein the groove has a circular cross-section of more than half a circle.

5. A first aluminum article according to claim 2, wherein the groove has a trapezium cross-section with a smaller width defining an opening to the groove than a width defining the base of the trapezium at the bottom of the groove.

6. A first aluminum article according to claim 4, wherein the brazing wire is mechanically locked within the groove by a deformed portion of the groove.

7. A first aluminum article according to claim 1, wherein the first aluminum article is an extrusion and the recess extends in a direction parallel to an extrusion direction of the first aluminum article.

8. A first aluminum article according to claim 1, wherein the first aluminum article is a manifold for a heat exchanger.

9. A process of producing a first aluminum article having a surface configured for joining by brazing or soldering to a second aluminum article, wherein a portion of the surface of the first aluminum article is provided with at least one recess in which there is mechanically locked an amount of brazing material, the process comprising extruding the first aluminum article to form the recess as at least one groove extending along the extrusion direction, and then mechanically locking the amount of brazing material in the form of a brazing wire inserted into the groove.

10. A process according to claim 9, wherein the brazing wire is mechanically locked in the groove by deforming a portion of the groove.

11. A process according to claim 9, wherein the brazing wire is mechanically locked in the groove as a result of the brazing wire having a different cross-sectional shape than the groove.

12. A process according to claim 9, further comprising the steps of assembling the second aluminum article with the first aluminum article, and then brazing the first and second aluminum articles together by heating the first and second aluminum articles to melt and flow the brazing wire.

13. A heat exchanger comprising a manifold having a surface configured for receiving tubes to which the manifold is to be joining by brazing or soldering, the surface of the manifold comprising at least one groove in which a brazing wire is mechanically locked as a result of cross-sectional shapes of the brazing wire and the groove.

14. A heat exchanger according to claim 13, wherein the brazing wire is mechanically locked in the groove by a deformed portion of the groove.

15. A heat exchanger according to claim 13, wherein the brazing wire is mechanically locked in the groove as a result of the brazing wire having a different cross-sectional shape than the groove.

16. A heat exchanger according to claim 13, wherein the groove has a circular cross-section of more than half a circle.

17. A heat exchanger according to claim 16, wherein the brazing wire is mechanically locked within the groove by a deformed portion of the groove.

18. A heat exchanger according to claim 13, wherein the groove has a trapezium cross-section with a smaller width defining an opening to the groove than a width defining the base of the trapezium at the bottom of the groove.

19. A heat exchanger according to claim 18, wherein the brazing wire is mechanically locked in the groove as a result of the brazing wire having a different cross-sectional shape than the groove.

20. A heat exchanger according to claim 13, wherein the manifold is an extrusion and the groove extends in a direction parallel to an extrusion direction of the manifold.

* * * * *